Patented July 18, 1944

2,353,766

UNITED STATES PATENT OFFICE 2,353,766

TREATMENT OF HYDROCARBONS

Louis Schmerling, Chicago, Ill., assignor to Universal Oil Products Company, Chicago, Ill., a corporation of Delaware No Drawing. Application May 9, 1942, Serial No. 442,383

21 Claims. (Cl. 260—658)

This invention relates to the condensation of isoparaffins with halo-olefins in the presence of metal halide catalysts of the Friedel-Crafts type. More specifically, the process is concerned with a method of reacting isoparaffinic hydrocarbons with unsaturated halides to produce higher boiling alkyl halides and hydrocarbons of higher molecular weight than the isoparaffins charged.

In one specific embodiment the present invention comprises a process for reacting isoparaffinic hydrocarbons with halo-olefins in the presence of a metal halide catalyst of the Friedel-Crafts type.

Isobutane is the isoparaffin preferably subjected to reaction with a halo-olefin such as a chloro-olefin, bromo-olefin, etc., although higher molecular weight isoparaffins also react with such unsaturated halides to produce higher boiling alkyl halides or hydrocarbons of higher molecular weight than the isoparaffin charged. However, as the higher molecular weight isoparaffins such as isopentane, isohexane, etc., are themselves valuable constituents of gasoline, they are consequently used less commonly than isobutane as charging stocks for conversion into higher molecular weight alkyl halides. Hydrocarbon mixtures containing substantial proportions of isoparaffins and normal paraffins are also utilizable in the process of this invention.

Halo-olefins which may be reacted or condensed with isoparaffins according to the process of the present invention contain at least one halogen atom per molecule and comprise haloethenes, -propenes, -butenes, -pentenes, and higher halo-alkenes. Vinyl chloride, allyl chloride, methallyl chloride, and the corresponding bromine compounds are representative of suitable halo-olefins. The term halo-olefins is also used herein in reference to other unsaturated compounds containing more than one halogen atom and more than one double bond per molecule. Halo-olefins may be formed in any suitable manner such as by the action of a halogen upon an olefinic hydrocarbon at a temperature at which substitution occurs and substantially in excess of that at which addition of halogen to the olefinic double bond is the principal reaction. They may also be prepared by the removal of one molecule of hydrogen halide from a dihalo-alkene by any of several well-known methods.

Catalysts of the Friedel-Crafts type utilizable in effecting the interaction of a halo-olefin with an isoparaffin include metal chlorides and bromides and particularly chlorides of aluminum and zirconium. Of these catalytic materials, aluminum chloride is generally more widely applicable in that it possesses substantial catalytic activity at relatively low temperatures. Metal halides of the Friedel-Crafts type are employed as catalysts preferably at temperatures between about $-30°$ and about $+25°$ C., although higher temperatures, generally not in excess of about $100°$ C., are also sometimes utilizable with certain reaction mixtures comprising essentially isoparaffins and halo-olefins.

Metal halide catalysts of the Friedel-Crafts type may be employed as such, as mixtures, or supported by carriers such as alumina, diatomaceous earth, clay, pumice, activated charcoal, etc. The materials so utilizable as carriers should have substantially no harmful effect on the catalyst activity of the metal halide or mixture of metal halides employed.

While the reaction of an isoparaffin with a halo-olefin is not understood completely, it is believed that it involves the addition of an isoparaffin to the double bond of the halo-olefin particularly at temperatures below about $0°$ C. Such an addition reaction apparently results in the formation of an alkyl halide of higher boiling point than the reactants and with a molecular weight which is equal to the sum of the molecular weights of the reacting isoparaffin and unsaturated halide. At a higher reaction temperature it appears that an alkyl halide is first formed and then this compound undergoes an intra-molecular change or hydrogen disproportionation with the charged isoparaffin producing a higher boiling isoparaffin and liberating hydrogen halide. Thus, in runs in which allyl chloride was added gradually to a mixture of catalyst and isobutane at the reflux temperature of isobutane, it was possible to obtain varying yields of liquid paraffins and of chloroheptane depending upon the proportions of allyl chloride, isobutane, and catalyst present in the reaction mixture. An increase in the proportion of allyl chloride introduced resulted in an increased amount of paraffins due probably to the higher reaction temperature which prevailed toward the end of the period during which allyl chloride was introduced. In order to obtain high yields of alkyl halides a molar excess of isoparaffin to halo-olefin should be present throughout the entire reaction. Generally not more than about 20 molecular proportions of isoparaffin per molecular proportion of halo-olefin are present in the reaction mixture charged to the process.

Paraffin formation, as mentioned above, probably occurred by way of intra-molecular hydrogen disproportionation between chloroheptane and isobutane. Reactions of this type are illustrated by the following equations:

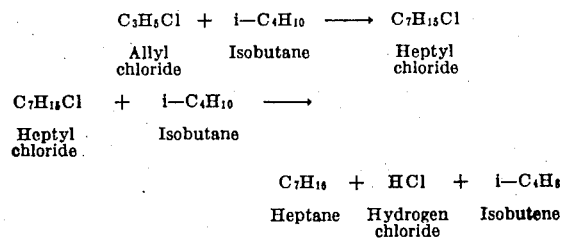

$$C_3H_5Cl + i\text{-}C_4H_{10} \longrightarrow C_7H_{15}Cl$$
Allyl chloride    Isobutane    Heptyl chloride $$C_7H_{15}Cl + i\text{-}C_4H_{10} \longrightarrow$$
Heptyl chloride    Isobutane $$C_7H_{16} + HCl + i\text{-}C_4H_8$$
Heptane    Hydrogen chloride    Isobutene The isobutene thus formed according to the equation may then react with either aluminum chloride to form sludge-like material or with isobutane to form a paraffin fraction containing substantial amounts of iso-octane.

I have found that condensation of a monohalo-olefin with an isoparaffin in the presence of a Friedel-Crafts type catalyst results not only in the formation of an alkyl halide but also that the reaction mixture usually contains dihalides having the same number of carbon atoms per molecule as the monohaloalkane which is the major product of the reaction.

The condensation of an isoparaffin with a halo-olefin, unsaturated halide, or alkenyl halide of the type of vinyl-, allyl-, methallyl-chloride or -bromide, etc., is carried out using either batch or continuous operation. Thus, in batch type operation a halo-olefin is added gradually to a reactor containing an isoparaffin and a catalyst of the Friedel-Crafts type. The reaction temperature is maintained preferably between about −30° and about 25° C. and under sufficient pressure to keep in liquid state a substantial proportion of the reactants. The reaction mixture is also agitated by stirring, shaking, or some other suitable means to effect intimate contact of the reactants and catalyst. During this treatment, the isoparaffin combines chemically with the halo-olefin to produce an alkyl halide with a molecular weight which is equal to the sum of the molecular weights of the reacting isoparaffin and halo-olefin. At higher temperatures, some of the alkyl halide may be converted into paraffinic hydrocarbons of gasoline boiling range, said hydrocarbons being the principal product of the process when the condensation reaction is carried out at a temperature of about 25° C. or higher in the presence of a catalyst of relatively high activity. At the higher reaction temperatures, hydrogen chloride is generally evolved from the reaction mixture. After such a batch type of operation, the normally liquid products are separated from the catalyst and the latter is returned to further use in the condensation reaction zone. Hydrogen halide present in the reaction products may be returned to the process or utilized for some other purpose as desired. In some cases it is desirable to commingle hydrogen with the reaction mixture since it has a tendency to increase the active life of the catalyst.

Continuous condensation of isoparaffin with a halo-olefin is carried out by introducing the halo-olefin, also referred to as an unsaturated halide, or a mixture of an isoparaffin and said halide to a circulating commingled mixture of an isoparaffin and a metal halide catalyst, particularly aluminum chloride or another compound of the Friedel-Crafts type. The mixture of isoparaffin, halo-olefin, catalyst, and sometimes, a hydrogen halide is directed through a tortuous path in some type of baffle mixer or through a reactor containing packing material to effect intimate contact of the catalyst with the reacting hydrocarbons. The conditions of temperature and pressure employed in such a condensation treatment are within the limits indicated above, but particular conditions used in any given condensation reaction vary with the molecular weights and reactivities of the reactants, the concentration and activity of the catalyst employed, and other factors.

The following examples are given to illustrate the character of the results obtained by the use of the present process, although the data presented are not introduced with the intention of unduly restricting the generally broad scope of the invention.

EXAMPLE I

Several runs indicated in Table 1 were made at the reflux temperature of the reaction mixture and at atmospheric pressure by introducing allyl chloride gradually to a well-stirred mixture of aluminum chloride and isobutane. In the first of these runs it was found that very little hydrogen chloride was evolved until about 40 grams of allyl chloride had been added to the mixture of 15 grams of aluminum chloride and 160 grams of isobutane. At this point, the catalyst had been converted from the original yellow powder into a tan colored semisolid material most of which collected on the walls of the reaction vessel. When more allyl chloride was added, a copious evoluation of hydrogen chloride occurred and the catalyst became more liquid in appearance and darker in color. Addition of allyl chloride was stopped after 90 grams had been introduced to the reaction during a period of 2 hours but the stirring was continued for another hour during which time the evolution of hydrogen chloride increased. Evolution of hydrogen chloride was quite rapid at the end of the hour of stirring at which time the reaction product was separated from the catalyst layer. Distillation of the stabilized and washed liquid product showed that it had a wide boiling range with plateaus corresponding to hexane, heptane, and chloroheptane.

TABLE 1

*Condensation of allyl chloride with isobutane*

| | Run No. | | | | | |
|---|---|---|---|---|---|---|
| | 1 | 2 | 3 | 4 | 5 | 6 |
| Reactants, grams: | | | | | | |
|   Isobutane | 160 | 202 | 195 | 380 | 350 | 365 |
|   Allyl chloride | 90 | 52 | 56 | 94 | 92 | 164 |
|   Aluminum chloride catalyst | 15 | 30 | 5 | 15 | 80 | 80 |
| Products, grams: | | | | | | |
|   Condensible gas | 74 | 172 | 170 | 325 | 277 | 120 |
|   Liquid product | 137 | 78 | 70 | 135 | 151 | 284 |
|   Hydrogen chloride | 17 | 1 | 3 | 4 | 8 | 63 |
|   Used catalyst | 33 | 33 | 13 | 21 | 88 | 128 |
|   Loss | 4 | 0 | 0 | 4 | 0 | 14 |
| Yields, weight percent of the allyl chloride charged: | | | | | | |
|   Liquid paraffins | 85 | 30 | 10 | 9 | 50 | 175 |
|   Chloroheptane | 30 | 70 | 40 | 60 | 68 | 0 |
|   Dichloroheptane | 15 | 30 | 36 | 33 | 28 | 0 |
|   Higher-boiling chlorohydrocarbons | 25 | 30 | 36 | 33 | 28 | 0 |
|   Catalyst weight increase | 20 | 6 | 14 | 6 | 9 | 29 |

In Run 2 shown in the table, the addition of allyl chloride was stopped as soon as an appreciable amount of hydrogen chloride began to be evolved, after which stirring was continued for 10 minutes. The liquid product was then decanted immediately from the yellow granular catalyst, stabilized, washed and distilled. When using this method of treatment a small amount of material was obtained boiling in the heptane range and a very large amount in the chloroheptane range. There was very little intermediate product but evidence was available showing the presence of chloro-hexane. These results indicate that under the conditions shown chloroheptane is a primary product formed in the reaction of isobutane with allyl chloride in the presence of aluminum chloride.

Runs 3, 4, and 5 were made by reacting isobutane and allyl chloride in the presence of progressively larger amounts of aluminum chloride as shown in Table 1. The formation of liquid paraffins was greatest in the presence of the largest amount of catalyst and the production of chloroheptane and dichloroheptane was also considerable.

Run 6 in which more allyl chloride was charged than than introduced in Run 5, but with the same amount of aluminum chloride catalyst, yielded a reaction product consisting almost entirely of liquid paraffinic hydrocarbons. The catalyst also increased in weight more than did the catalysts employed in the other runs to which less allyl chloride was charged.

EXAMPLE II

In each of a number of runs, 380 grams of isobutane and aluminum chloride or zirconium chloride in the amounts shown in Table 2 were contacted with 82 grams of allyl chloride, the latter being introduced slowly to the reactor during a period of 1 to 2 hours, while the reaction mixture was stirred and maintained at temperatures between about −40° and +50° C. Runs 8 and 9 were carried out under atmospheric pressure in a glass vessel provided with a stirrer, but each of the other runs was made in a rotatable steel autoclave under the vapor pressure of the reaction mixture. At temperatures below about −25° C. the allyl chloride was recovered unchanged, while in similar operations but at −25° C. chloroheptane and other chlorinated hydrocarbons were obtained. At higher temperatures and particularly at +20° to 30° C., paraffinic hydrocarbons constituted the main product of the process.

TABLE 2

Condensation of allyl chloride with isobutane

| Run No. | Catalyst | Weight of catalyst | Temp. | Products |
|---|---|---|---|---|
| | | Grams | °C. | |
| 8 | AlCl₃ | 20 | −35 | Allyl chloride recovered. |
| 9 | AlCl₃ | 20 | −25 | Chloroheptane and other chlorine-containing compounds. |
| 11 | AlCl₃ | 6 | +24 | Chiefly paraffins with some chloroheptane. |
| 12 | AlCl₃ | 15 | 20 | Paraffins. |
| 13 | AlCl₃ | 15 | 30 | Do. |
| 15 | ZrCl₄ | 20 | 28 | Chloroheptane and other chlorine-containing compounds. |
| 16 | ZrCl₄ | 20 | 50 | Relatively high boiling hydrocarbons. |

As indicated by Runs 15 and 16 in Table 2, zirconium chloride catalyzed the condensation of allyl chloride with isobutane at room temperature to form substantially the same chloro-compounds which were obtained in the presence of aluminum chloride at a lower temperature. Very little reduction of the chloro-compounds to heptane occurred in Run 15 in the presence of zirconium chloride.

EXAMPLE III

Following essentially the same procedure used in Runs 8 and 9 of Example II, the condensation of 45 grams of 2-chloro-propene with 380 grams of isobutane in the presence of 20 grams of aluminum chloride at −25° C. yielded a mixture of chloroheptane and heptane. In a similar run at −40° C. no reaction occurred but at −10° C. only paraffins (essentially heptanes) and some tertiary butyl chloride were obtained probably as the result of condensation and reduction reactions.

The formation of tertiary butyl chloride during the reaction of 2-chloropropene with isobutane was believed to indicate the intermediate formation of isobutene which then could react with hydrogen chloride to produce tertiary butyl chloride.

EXAMPLE IV

Following the procedure used in Examples II and III, several runs were made in each of which 84 grams of methallyl chloride was added gradually during 2 to 3 hours to a well-stirred mixture of 385 grams of isobutane and 20 grams of aluminum chloride maintained at a constant temperature by means of a cooling bath surrounding the reactor. In this way methallyl chloride was condensed with isobutane at temperatures as low as 25° C. but no reaction occurred at −50° C. The reaction product obtained at −10° C. was chiefly paraffinic while that formed at −25° C. was a mixture of paraffins (predominantly octanes) and chloro-octane.

EXAMPLE V

A hexane fraction, tertiary butyl chloride, and a chloro-compound (apparently $C_6H_{12}Cl_2$) boiling at 146° to 148° C. were the chief products formed by reacting isobutane with vinyl chloride in the presence of aluminum chloride at −10° and +23° C. No reaction occurred when isobutane, vinyl chloride, and aluminum chloride were contacted for 1 hour at −25° C. The results obtained in 4 runs made at these different temperatures are shown in Table 3.

TABLE 3

Condensation of vinyl chloride with isobutane

| | Run No. | | | |
|---|---|---|---|---|
| | 1 | 2 | 3 | 4 |
| Reactants, grams: | | | | |
| Isobutane | 340 | 383 | }¹449 | 80 |
| Vinyl chloride | 80 | 96 | | 32 |
| Aluminum chloride catalyst | 30 | 20 | 20 | 8 |
| Time, hours | 2 | 1 | ²3 | 4 |
| Temperature, °C | −10 | −25 | −11 | 25 |
| Products, grams: | | | | |
| Condensible gas | 281 | 453 | 277 | 23 |
| Liquid product | 121 | 0 | 123 | 61 |
| Catalyst layer | 31 | 27 | 42 | 22 |
| Hydrogen chloride | 6 | 0 | 2 | 7 |
| Loss | 11 | 19 | 25 | 7 |
| Distillation of liquid product, vol. percent: | | | | |
| Below 20° C | 22 | | 13 | 34 |
| 20–55° C | 11 | | 16 | 5 |
| 55–75 | 8 | | 10 | 17 |
| 75–95 | 1 | | 1 | 5 |
| 95–125 | 6 | | 8 | 7 |
| 125–150 | 35 | | 31 | 15 |
| 150–175 | 7 | | | 4 |
| 175–200 | 6 | | | |
| Residue | 4 | | 18 | 5 |

¹ Condensible gas from Run 2.
² Bath temperature was −30° C. at beginning and was slowly (during 1.5 hours) allowed to rise to −11° C. at which temperature it was kept for an additional 1.5 hours.

EXAMPLE VI

The condensation of dichloro-ethylene with isobutane occurred at 20–25° C. in the presence of aluminum chloride, yielding hexanes, octanes, and a chloro-compound boiling between 196° and 200° C. and melting at about −16° C. The results obtained in two runs are shown in Table 4.

TABLE 4

*Condensation of dichloro-ethylene with isobutane*

| | | |
|---|---|---|
| Temperature, °C | 23 | 24 |
| Time of rotation of autoclave, hours | 4 | 4 |
| Reactants, grams: | | |
| Isobutane | 47 | 122 |
| Dichloro-ethylene | 20 | 50 |
| Aluminum chloride catalyst | 5 | 10 |
| Products, grams: | | |
| Unconverted isobutane | 20 | 48 |
| Liquid product | 28 | 93 |
| Used catalyst | 15 | 28 |
| Hydrogen chloride | 5 | 11 |
| Loss | 4 | 2 |
| Distillation of liquid product, vol. per cent: | | |
| Fraction boiling— | | |
| Below 50° | 8 | 6 |
| 50–75° | 13 | 9 |
| 75–95° | 6 | 2 |
| 95–125° | 8 | 8 |
| 125–175° | 7 | 3 |
| 175–200° | 25 | 25 |
| Residue | 6 | 3 |

The novelty and utility of the process of the present invention are evident from the preceding specification and examples, although neither section is intended to unduly limit its generally broad scope.

I claim as my invention:

1. A process which comprises reacting an isoparaffinic hydrocarbon with a halo-olefin in the presence of a metal halide catalyst.

2. A process which comprises reacting an isoparaffinic hydrocarbon with a halo-olefin in the presence of a metal halide catalyst of the Friedel-Crafts type.

3. A process which comprises reacting an isoparaffinic hydrocarbon with a halo-olefin in the presence of a metal halide catalyst of the Friedel-Crafts type at a temperature of from about −30° to about 100° C.

4. A process which comprises reacting an isoparaffinic hydrocarbon with a halo-olefin in the presence of a metal halide catalyst of the Friedel-Crafts type at a temperature of from about −30° to about 100° C. under sufficient pressure to keep in liquid state a substantial proportion of the reaction mixture.

5. A process which comprises reacting a relatively low boiling isoparaffinic hydrocarbon with a mono halo-olefin in the presence of a metal halide catalyst of the Friedel-Crafts type.

6. A process which comprises reacting a relatively low boiling isoparaffinic hydrocarbon with a halo-olefin in the presence of a metal halide catalyst of the Friedel-Crafts type at a temperature of from about −30° to about 100° C.

7. A process which comprises reacting a relatively low boiling isoparaffinic hydrocarbon with a halo-olefin in the presence of a metal halide catalyst of the Friedel-Crafts type at a temperature of from about −30° to about +100° C. under sufficient pressure to keep in liquid state a substantial proportion of the reaction mixture.

8. The process of claim 3 further characterized in that said halo-olefin comprises a chloro-olefin.

9. The process of claim 6 further characterized in that said relatively low boiling isoparaffinic hydrocarbon comprises isobutane.

10. The process of claim 6 further characterized in that said relatively low boiling isoparaffinic hydrocarbon comprises isopentane.

11. A process which comprises reacting an isoparaffinic hydrocarbon with a halo-olefin in the presence of an aluminum halide catalyst.

12. A process which comprises reacting an isoparaffinic hydrocarbon with a mono chloro-olefin in the presence of an aluminum chloride catalyst.

13. A process which comprises reacting an isoparaffinic hydrocarbon with a chloro-olefin in the presence of an aluminum chloride catalyst at a temperature of from about −30° to about 100° C.

14. A process which comprises reacting an isoparaffinic hydrocarbon with a chloro-olefin in the presence of an aluminum chloride catalyst at a temperature of from about −30° to about 100° C. under sufficient pressure to keep in liquid state a substantial proportion of the reaction mixture.

15. A process which comprises reacting isobutane with a chloro-olefin in the presence of an aluminum chloride catalyst at a temperature of from about −30° to about 100° C. under sufficient pressure to keep in liquid state a substantial proportion of the reaction mixture.

16. A process which comprises reacting isopentane with a chloro-olefin in the presence of an aluminum chloride catalyst at a temperature of from about −30° to about 100° C. under sufficient pressure to keep in liquid state a substantial proportion of the reaction mixture.

17. A process which comprises reacting isobutane with a halo-ethene in the presence of an aluminum chloride catalyst at a temperature of from about −30° to about 100° C. under sufficient pressure to keep in liquid state a substantial proportion of the reaction mixture.

18. A process which comprises reacting isobutane with a mono chloropropene in the presence of an aluminum chloride catalyst at a temperature of from about −30° to about 100° C. under sufficient pressure to keep in liquid state a substantial proportion of the reaction mixture.

19. A process which comprises reacting isobutane with a mono chloro-butene in the presence of an aluminum chloride catalyst at a temperature of from about −30° to about 100° C. under sufficient pressure to keep in liquid state a substantial proportion of the reaction mixture.

20. A process which comprises reacting isobutane with allyl chloride in the presence of an aluminum chloride catalyst at a temperature of from about −30° to about 100° C. under sufficient pressure to keep in liquid state a substantial proportion of the reaction mixture.

21. A process which comprises reacting isobutane with dichloroethylene in the presence of an aluminum chloride catalyst at a temperature of from about −30° C. to about 100° C. under sufficient pressure to maintain a substantial portion of the reactants in liquid phase.

LOUIS SCHMERLING.